US010187682B2

(12) United States Patent
Grover

(10) Patent No.: US 10,187,682 B2
(45) Date of Patent: *Jan. 22, 2019

(54) FREQUENCY CAPPING FOR MEDIA CONTENT

(71) Applicant: Sorenson Media, Inc, Draper, UT (US)

(72) Inventor: Matthew Grover, Draper, UT (US)

(73) Assignee: Sorenson Media, Inc., Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,796

(22) Filed: Jul. 5, 2017

(65) Prior Publication Data

US 2017/0302984 A1    Oct. 19, 2017

Related U.S. Application Data

(63) Continuation of application No. 15/164,682, filed on May 25, 2016, now Pat. No. 9,723,347.

(60) Provisional application No. 62/235,811, filed on Oct. 1, 2015, provisional application No. 62/235,856, filed on Oct. 1, 2015.

(51) Int. Cl.
| | |
|---|---|
| *H04N 21/2668* | (2011.01) |
| *H04N 21/24* | (2011.01) |
| *H04N 21/258* | (2011.01) |
| *H04N 21/44* | (2011.01) |
| *H04N 21/6547* | (2011.01) |

(Continued)

(52) U.S. Cl.
CPC ..... *H04N 21/2668* (2013.01); *H04N 21/2407* (2013.01); *H04N 21/25883* (2013.01); *H04N 21/44008* (2013.01); *H04N 21/6547* (2013.01); *H04N 21/812* (2013.01); *H04N 21/8352* (2013.01)

(58) Field of Classification Search
None
See application file for complete search history.

(56) References Cited

U.S. PATENT DOCUMENTS

| | | |
|---|---|---|
| 2002/0138734 A1 | 9/2002 | David et al. |
| 2006/0294244 A1 | 12/2006 | Naqvi et al. |

(Continued)

OTHER PUBLICATIONS

International Search Report and Written Opinion dated Jan. 26, 2017 on application No. PCT/US2016/053997.

*Primary Examiner* — Omar S Parra
(74) *Attorney, Agent, or Firm* — Honigman Miller Schwartz and Cohn LLP

(57) ABSTRACT

A method includes receiving, at a data processing device, a fingerprint of a media segment to be displayed on a media device and determining, by the data processing device, a number of times the media segment has been displayed on the media device based on the fingerprint. The method further includes determining, by the data processing device, whether the number of times the media segment has been displayed on the media device satisfies a threshold criterion. When the number of times the media segment has been displayed on the media device satisfies the threshold criterion, the method includes identifying, by the data processing device, an overlay content segment to be displayed on the electronic device in lieu of the media segment and instructing, by the data processing device, the media device to display the overlay content segment in lieu of the media segment.

23 Claims, 6 Drawing Sheets

(51) Int. Cl.
    *H04N 21/81*     (2011.01)
    *H04N 21/8352*     (2011.01)

(56) References Cited

U.S. PATENT DOCUMENTS

| | | |
|---|---|---|
| 2007/0100701 A1 | 5/2007 | Boccon-Gibod et al. |
| 2007/0168517 A1 | 7/2007 | Weller et al. |
| 2010/0255890 A1 | 10/2010 | Mikkelsen et al. |
| 2011/0225417 A1 | 9/2011 | Maharajh et al. |
| 2012/0096264 A1 | 4/2012 | Traversat et al. |
| 2015/0221336 A1* | 8/2015 | Deen .................. G11B 27/031 386/290 |
| 2016/0286283 A1* | 9/2016 | Oku ................... G06K 9/00221 |
| 2017/0026718 A1* | 1/2017 | Yabu ................. H04N 21/8352 |

\* cited by examiner

FREQUENCY CAPPING FOR MEDIA CONTENT

CROSS REFERENCE TO RELATED APPLICATIONS

This U.S. patent application is a continuation of, and claims priority under 35 U.S.C. § 120 from, U.S. patent application Ser. No. 15/164,682, filed on May 25, 2016, which claims priority under 35 U.S.C. § 119(e) to U.S. Provisional Application 62/235,811, filed on Oct. 1, 2015 and U.S. Provisional Application 62/235,856, filed on Oct. 1, 2015. The disclosures of these prior applications are considered part of the disclosure of this application and are hereby incorporated by reference in their entireties.

TECHNICAL FIELD

This disclosure relates to frequency capping for media content.

BACKGROUND

Media consumption devices, such as smart televisions (TVs), may access broadcast digital content and receive data, such as streaming media, from data networks. Streaming media refers to a service in which an end user may request media content, such as movies or news, over a telephone line, a cable channel, an Internet channel, and so forth. For example, a user may view a movie without having to leave their residence. In addition, users may access various types of educational content, such as video lectures, without having to attend a physically class at a school or an educational institution.

As the number of media consumption devices continues to increase, video content generation and delivery may similarly increase. With an increase in the use of media consumption devices that access the broadcast digital content and the streaming media, content providers or network providers may distribute contextually relevant material to viewers that are consuming the broadcast digital content or the streaming media. For example, local broadcasters may include contextually relevant advertisements and interactive content with the broadcast digital content or the streaming media.

SUMMARY

One aspect of the disclosure provides a method that includes receiving, at a data processing device, a fingerprint of a media segment to be displayed on a media device and determining, by the data processing device, a number of times the media segment has been displayed on the media device based on the fingerprint. The method further includes determining, by the data processing device, whether the number of times the media segment has been displayed on the media device satisfies a threshold criterion. When the number of times the media segment has been displayed on the media device satisfies the threshold criterion, the method includes identifying, by the data processing device, an overlay content segment to be displayed on the electronic device in lieu of the media segment and instructing, by the data processing device, the media device to display the overlay content segment in lieu of the media segment.

Implementations of the disclosure may include one or more of the following optional features. In some implementations, determining the number of times the media segment has been displayed on the media device includes: receiving, at the data processing device, a media device identifier; determining, by the data processing device, a media segment identifier for the media segment using the fingerprint; and querying, by the data processing device, a data source using the media device identifier and the media segment identifier to obtain a display count tracking the number of times the media segment has been displayed on the media device. In some examples, the method includes: sending a trigger from the data processing device to the media device; receiving, at the data processing device, a notification from the media device, the notification comprising the media device identifier and the media segment identifier; and incrementing the display count in response to receiving the notification.

In some implementations, when instructing the media device to display the overlay content segment in lieu of the media segment, the method includes incrementing a display count tracking the number of times the media segment has been displayed on the media device. The method may include receiving, at the data processing device, a notification from the media device indicating that the media device displayed the overlay content segment and, in response to receiving the notification, incrementing, by the data processing device, a display count tracking the number of times the media segment has been displayed on the media device.

The threshold criterion may be satisfied when the number of times the media segment has been displayed on the media device is greater than a first count. Moreover, the threshold criterion may be satisfied when the number of times the media segment has been displayed on the media device is less than a second count. The second count is greater than the first count.

Another aspect of the disclosure provides a system that includes data processing hardware and memory hardware in communication with the data processing hardware. The memory hardware stores instructions that when executed on the data processing hardware cause the data processing hardware to perform operations. The operations include receiving a fingerprint of a media segment to be displayed on a media device, determining a number of times the media segment has been displayed on the media device based on the fingerprint, and determining whether the number of times the media segment has been displayed on the media device satisfies a threshold criterion. When the number of times the media segment has been displayed on the media device satisfies the threshold criterion, the operations further include identifying an overlay content segment to be displayed on the electronic device in lieu of the media segment and instructing the media device to display the overlay content segment in lieu of the media segment.

This aspect may include one or more of the following optional features. In some implementations, determining the number of times the media segment has been displayed on the media device includes: receiving, at the data processing device, a media device identifier; determining, by the data processing device, a media segment identifier for the media segment using the fingerprint; and querying, by the data processing device, a data source using the media device identifier and the media segment identifier to obtain a display count tracking the number of times the media segment has been displayed on the media device. In some examples, the operations include: sending a trigger from the data processing device to the media device; receiving, at the data processing device, a notification from the media device, the notification comprising the media device identifier and the media segment identifier; and incrementing the display count in response to receiving the notification.

In some implementations, when instructing the media device to display the overlay content segment in lieu of the media segment, the method includes incrementing a display count tracking the number of times the media segment has been displayed on the media device. The operations may include receiving, at the data processing device, a notification from the media device indicating that the media device displayed the overlay content segment and, in response to receiving the notification, incrementing, by the data processing device, a display count tracking the number of times the media segment has been displayed on the media device.

The threshold criterion may be satisfied when the number of times the media segment has been displayed on the media device is greater than a first count. Moreover, the threshold criterion may be satisfied when the number of times the media segment has been displayed on the media device is less than a second count. The second count is greater than the first count.

In yet another aspect, an overlay content server device includes a first network connection to a media device configured to execute an automatic content recognition (ACR) system, a third network connection to a data source, and a data processing device coupled to the first network connection and the third network connection. The media device is configured to receive media content that comprises a plurality of media segments from a content source device over a second network connection between the content source device and the media device. Moreover, the ACR system is configured to generate a fingerprint for a media segment of the plurality of media segments. The data processing device configured to perform operations that include receiving a fingerprint of a media segment to be displayed on a media device, determining a number of times the media segment has been displayed on the media device based on the fingerprint, and determining whether the number of times the media segment has been displayed on the media device satisfies a threshold criterion. When the number of times the media segment has been displayed on the media device satisfies the threshold criterion, the operations further include identifying an overlay content segment to be displayed on the electronic device in lieu of the media segment and instructing the media device to display the overlay content segment in lieu of the media segment.

This aspect may include one or more of the following optional features. In some implementations, determining the number of times the media segment has been displayed on the media device includes: receiving a media device identifier; determining a media segment identifier for the media segment using the fingerprint; and querying the data source using the media device identifier and the media segment identifier to obtain a display count tracking the number of times the media segment has been displayed on the media device. The operations may further include: sending a trigger from the data processing device to the media device; receiving a notification from the media device, the notification comprising the media device identifier and the media segment identifier; and incrementing the display count in response to receiving the notification.

When instructing the media device to display the overlay content segment in lieu of the media segment, the operations may include incrementing a display count tracking the number of times the media segment has been displayed on the media device. In some examples, the operations include receiving, at the data processing device, a notification from the media device indicating that the media device displayed the overlay content segment and, in response to receiving the notification, incrementing, by the data processing device, a display count tracking the number of times the media segment has been displayed on the media device.

In some examples, the threshold criterion is satisfied when the number of times the media segment has been displayed on the media device is greater than a first count. In additional examples, the threshold criterion is satisfied when the number of times the media segment has been displayed on the media device is less than a second count, where the second count being greater than the first count. The media segment may be at least a portion of media content comprising a television show or a movie broadcast, and the media segment comprises a commercial.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
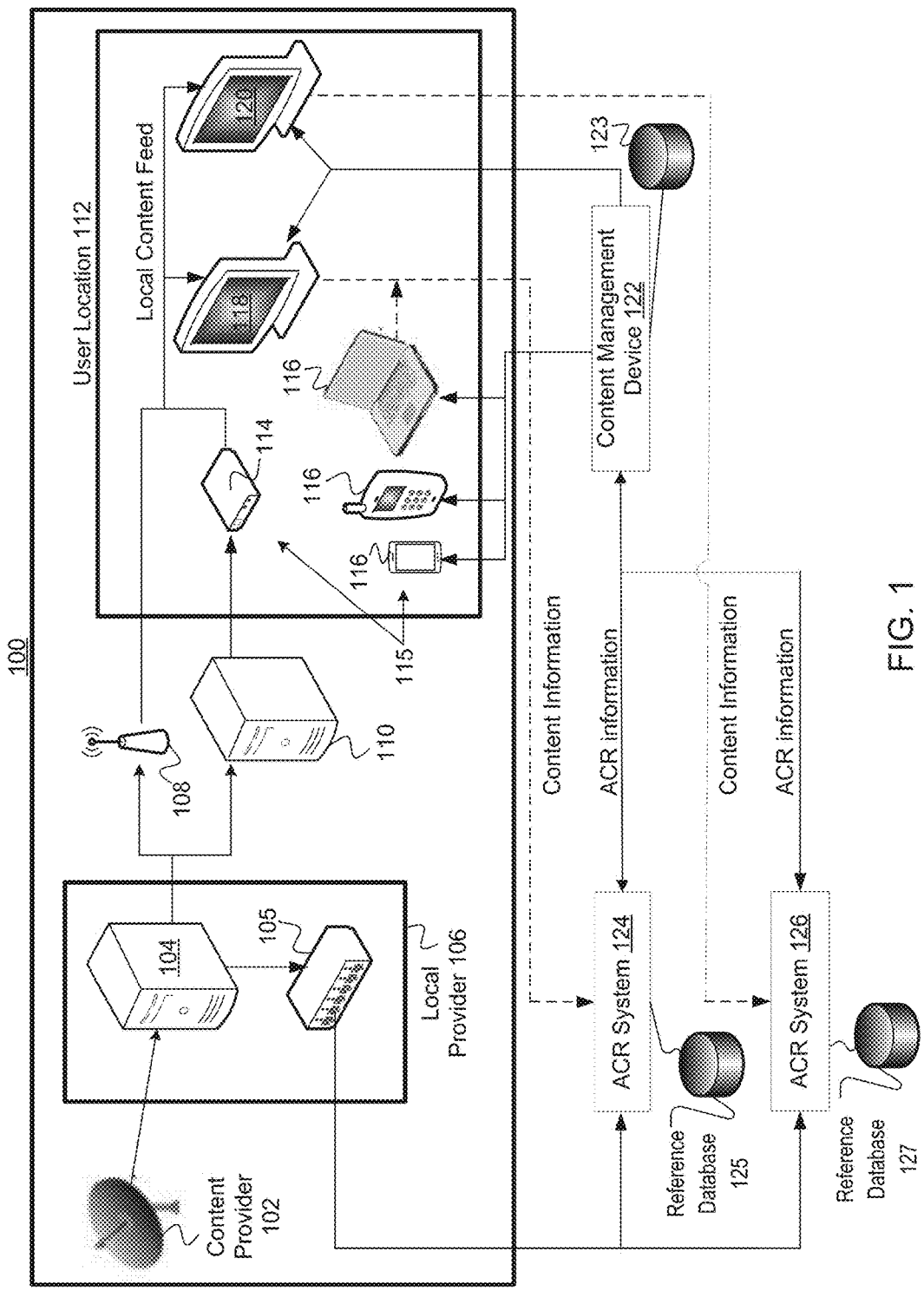
FIG. 1 illustrates an example system diagram of a content distribution network.

Currently, there are several hundred program choices offered by cable television (TV) providers and satellite providers. In addition, there are over one hundred major television market areas with dozens of local television channels. A content provider or broadcaster may generate content feeds at a central location and distribute the content feeds to a variety of locations. For example, a content provider may distribute a television channel to a number of network providers. The network providers can be local broadcasters, multi-channel networks, and other content owners or distributors.

The word "content" can refer to media or multimedia. The word "content" can also be a specific term that means the subject matter of the medium rather than the medium itself. Likewise, the word "media" and some compound words that include "media" (e.g. multimedia or hypermedia) are instead referring to content, rather than to the channel through which the information is delivered to the end user/audience. An example of a type of content commonly referred to as a type of media is a "motion picture," referred to as "a film." Another example is a "video," which typically includes video frames and audio samples.

Media content broadcasting or streaming, such as TV show or internet broadcast, may be an engaging venue to advertise products and services, provide information to viewers, or any combination thereof. To create revenue to provide numerous programming choices, content providers (such as television networks) can insert advertisements (ADs) into media content. Conventionally, advertisers have relied on sending one stream of media content to all the viewers of a channel, with the local broadcasters only targeting viewers based on an audience analysis and ratings providers, such as ratings provided by The Nielsen Company®.

To reach a viewer with a TV AD, conventional TV advertising assumes a viewer is watching the same channel for a period of time. In this example, a content provider or advertiser will show the TV AD within the period of time. In another example, to reach a viewer with the TV AD, a content provider or advertiser will use conventional TV advertising and show the TV AD repeatedly over a period of time. In this example, the content provider or the advertiser assumes the viewer will see the TV AD within the period of time.

These assumptions are often incorrect and can cause a viewer to miss viewing the TV AD at all. Alternatively, these assumptions can cause viewer to see the same TV AD multiple times, but the multiple viewings can have a negligible effect on the customer's intent to purchase a product shown in the TV AD. It would therefore be advantageous to determine what program a viewer is watching or is about to watch and send an identifier correlating to the program information to an overlay content server or an electronic device. The electronic device or overlay content server can use the identifier to target ADs to a viewer.

Described herein are methods, systems, and devices for limiting a number of times a media segment or overlay content segment is displayed. When a media segment has been displayed a threshold number of times, an overlay content segment can replace the media segment. For example, processing logic of an electronic device can overlay the overlay content segment on top of the media segment to replace the media segment. The processing logic may include hardware (e.g., circuitry, dedicated logic, programmable logic, microcode, etc.), software (e.g., instructions executed by a processing device), firmware or a combination thereof. In another example, the media segment and the overlay item are items in an overlay content set that includes multiple items.

Each time an individual has seen the media segment on an electronic device, a record can be made of the viewing of the media segment on the electronic device. When a number of times the media segment is to be displayed on the electronic device exceed a threshold, the processing logic of the electronic device can replace the media segment with the overlay content segment in the overlay content set.

One advantage of replacing the previously displayed media segment with the overlay content can be to display unique content to a viewer. For example, replacing the previously displayed media segment with the overlay content avoids showing the same person the same media segment repeatedly. Another advantage of replacing the previously displayed media segment with the overlay content can be to sequentially display media segments in the overlay content set to the viewer. For example, the electronic device can sequentially display the overlay content segments of the overlay content set to provide a progressive storyline to a viewer over a viewing period or multiple viewings of the media content by the user on the electronic device.

Another advantage of replacing the previously displayed media segment with the overlay content can be to reduce a number of times or a period of time a content provider or advertiser shows a media segment in the overlay content set to achieve a desired confidence level that the media segment has been viewed by the viewer. For example, once the media segment has been displayed to the viewer, the overlay content in the overlay content set can be displayed to the viewer to reduce advertising costs to an advertiser by avoiding paying to show the media segment to the viewer multiple times. The advertising cost can be reduced by decreasing a number of advertising spaces the advertiser needs to buy and reducing a risk that the viewer will not see the media segment of the overlay content set. The content overlay segments of the overlay content set can be overlay content that includes: ADs, news alerts, announcements, or other information in addition to media content of a content feed that is displayed to the viewers.

FIG. 1 illustrates a system diagram of a content distribution network 100 according to one embodiment. In the content distribution network 100, a content provider 102 may broadcast a content feed to a local provider 106. The local provider 106 may include a headend 104 and an ACR fingerprinter server 105. The headend 104 of the local provider 106 can receive a content feed from the content provider 102. The headend 104 may generate a local content feed based on the received content feed. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and it can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed to the ACR fingerprinter server 105, an over-the-air (OTA) broadcaster 108, and/or a multichannel video programming distributor (MVPD) 110. In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints to a cloud-based web service. In one embodiment, the ACR fingerprinter server 105 may be installed inside the broadcast facility in order to fingerprint a feed in advance of that feed being delivered to a display device, such as a television (TV).

The OTA broadcaster 108 and/or the MVPD 110 may communicate the local content feed to electronic devices 115. Some examples of the electronic devices 115 include electronic devices 118 and 120, a set top box 114 that streams media content to the electronic devices 118 and 120, as well as other devices 116 through which the user may stream the local content feed, e.g., wirelessly. In one example, the electronic devices 115 can include displays (such as liquid crystal displays or touchscreen displays) to display information.

In one example, the OTA broadcaster 108 may broadcast the local content feed using traditional local television channels or radio channels. In this example, the electronic devices 118 and 120 may include antennas (such as TV antennas or radio antennas) to receive the local content feed. In another example, the MVPD 110 (such as a cable broadcaster or a satellite broadcaster) may communicate the local content feed to a set top box 114. In this example, the set top box 114 may format the content feed for the electronic devices 118 and 120 and may communicate the formatted content feed to the electronic devices 118 and 120. The electronic devices 118 and 120 may include a display device, such as a television screen or a touch screen, to display the local content to a viewer.

Various components of the content distribution network 100 may be integrated or coupled to the electronic devices 118 and 120. For example, the electronic devices 118 and 120 can be smart televisions. In one example, the smart TV can include the antennas, the set top box 114 or an integrated ACR system, and the display device in a single unit. In another example, the smart TV can include a processing device and radio frequency (RF) circuitry. The processing device can execute an operating system (OS) and/or one or more applications, such as applications to access video-on-demand (VOD) content. The processing device can use an antenna of the radio frequency (RF) circuitry to communicate on a wireless local area network (WLAN). In one example, the processing device can use the RF circuitry to connect to the internet to access online interactive media or on-demand streaming media.

The ACR fingerprint server 105 may analyze the local content feed and determine fingerprint information (e.g., fingerprints). The ACR fingerprint server 105 may communicate the fingerprints to the ACR system 124 or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors.

The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In one example, the ACR system 124 can be coupled to a reference database 125. In another example, the ACR system 126 can be coupled to a reference database 127. The reference databases 125 and 127 can store fingerprints and media content. The content management device 122 can be a server component that receives messages from the ACR system 124 and/or 126. The messages can include information indicating what media content the electronic device 118 or 120 is going to display or is currently displaying. In one example, in response to the content management device 122 receiving the message, the content management device 122 can record an impression or association between the electronic device 118 or 120 and the media content stored in the database 123. In another example, in response to the content management device 122 receiving the message, the content management device 122 can generate and submit a query of the database 123 for available overlay content to superimpose on top of the media content.

In one embodiment, the ACR system 124 or 126 can send a fingerprint request to the electronic device 118 or 120, respectively, where the fingerprint request includes a frame format for the fingerprint. The electronic device 118 or 120 or an ACR system integrated into the electronic device 118 or 120 can generate a fingerprint in the frame format and send the fingerprint back to the ACR system 124 or 126. The ACR system 124 or 126 can use the fingerprint for media content identification.

The frame format can include a frame subdivided into multiple segments, as discussed in greater detail in the proceeding paragraphs. In one example, the frame format can exclude one or more segments of the multiple segments from being used by the ACR system 124 or 126 to match a content fingerprint to a stored fingerprint. For example, the one or more excluded segments can include a logo, closed caption text, an emergency message, and so forth. In another embodiment, the electronic device 118 or 120 can send a full fingerprint to the ACR system 124 or 126. The ACR system 124 or 126 can reformat the fingerprint to exclude one or more segments of the fingerprint as defined by the frame format. In one example, the ACR system 124 or 126 can request a variety of different fingerprint formats. In another example, the ACR system 124 or 126 can reformat the fingerprints into a variety of different formats to use for content recognition.

To find a match between the content fingerprint from the electronic device 115 and the stored fingerprint in the reference database, the ACR system 124 or 126 can perform a one-to-one comparison between the content fingerprints and the stored fingerprints. For example, the ACR system 124 or 126 can use an O(n) algorithm (e.g., a linear algorithm) for the comparison, where n is the number of elements in the reference database. When the ACR system uses the O(n) algorithm to search the entries in the database, the ACR system may have to search through all or a relatively large number of the stored fingerprints in the reference database to find a match.

The content management device 122 filters the overlay content using the device information for the electronic device 118 or 120. The content management device 122 can send an overlay content, via the ACR system 124 or 126, to the electronic device 118 or 120. In one embodiment, the electronic device 118 or 120 can display the overlay content to a viewer. In another embodiment, the electronic device 118 or 120 can replace the media content with the overlay content and display the overlay content to a viewer.

In one embodiment, the ACR system 124 or 126 can cause triggers to be displayed on the electronic device 118 or 120. The electronic device 118 or 120 can recognize the triggers and send a request to the content management device 122 to record an impression or association between the electronic device 118 or 120 and the media content in the database 123. For example, the electronic device 118 or 120 can send a request to the content management device 122 to record whether a viewer changes a channel when the electronic device 118 or 120 displays select media content.

The automatic content recognition may be performed in a distributed architecture as described herein. In one embodiment, an ACR system can reside on any of the electronic device 115, 118, or 120. In one embodiment, the ACR system can perform automatic content recognition. In another embodiment, a local ACR system or a local ACR fingerprint matcher integrated into the electronic device 115, 118, or 120 to perform the automatic content recognition. In another embodiment, the ACR system may perform ACR fingerprint matching as described herein. In another embodiment, the ACR system can be a client-side matching component.

The electronic devices 115, 118, or 120 can be a media device, such as a television, mobile phone, or dongle. The ACR system can be software or firmware that executes or runs on the electronic devices 115, 118, or 120. The ACR system can fingerprint media content (such as audio content, video content, closed captions, emergency messages, and so forth) during a playback of the media content. The ACR system can communicate with ACR system 124 or 126 to facilitate identification of content and trigger events to cause the content overlay system to perform dynamic ad replacement and/or superimposing overlay content on top of the media content. The proceeding paragraphs describe the interactions of the ACR system with the ACR fingerprint server 105 in greater detail.

The ACR fingerprint server 105 may analyze the local content feed that may include an ordered sequence of frames from the local content feed and capture fingerprints. The ACR fingerprint server 105 may communicate the fingerprints to the ACR system 124 or 126. The ACR systems 124 and 126 may be different ACR systems selected by device manufacturers, such as smart TV manufacturers. In one example, the ACR fingerprint server 105 may format fingerprints for the different ACR systems 124 and 126.

The ACR systems 124 and 126 may establish communication connections with the different electronic devices 115. The electronic devices 115 may communicate fingerprint information to the ACR systems 124 and 126, respectively. When the ACR system 124 or 126 receives ACR fingerprint information from the electronic devices 115, the ACR system 124 or 126 may match the received fingerprints with those generated by the ACR fingerprint server 105. When a match occurs and the ACR system 124 or 126 identifies content, the ACR system 124 or 126 may communicate ACR events to a content management device 122.

In another example, the ACR system 124 or 126 may receive ACR fingerprint information from one of the electronic devices 115 and may match the received fingerprints with those generated by the ACR fingerprint server 105. When a match occurs and the ACR system 124 or 126 identifies content, the ACR system 124 or 126 may notify the electronic device 115 of the ACR events. The electronic device 115 may communicate ACR event information to the content management device 122. Alternatively, or additionally, the ACR system 124 or 126 may directly communicate the ACR event information to the content management device 122. The ACR event information may include: information indicating the advertisements in the local content feed; information indicating selected or flagged content in the local content feed; or information indicating a change of a content channel at the electronic device 115 to new media content.

The ACR event information from the different ACR systems 124 and 126 may be in different formats and the content management device 122 may normalize the data into a common format. The content management device 122 can store the normalized data into a database 123. For example, the content management device 122 may receive disparate data sets from the ACR systems 124 and 126, the disparate data sets including similar but not identical data, such as data with the same content but formatted differently. The content management device 122 can process and reformat the disparate data sets to create a single data model or format (e.g., reformatted data sets). The content management device 122 can store the reformatted data sets in the database 123.

In one embodiment, to normalize disparate data sets from ACR systems 124 and 126, the content management device 122 may remove or filter data in the data sets. For example, some data sets may include fields or data that may be irrelevant to the content management device 122. In this example, the content management device 122 may remove or filter the irrelevant data. In another embodiment, to normalize the disparate data sets from the ACR systems 124 and 126, the content management device 122 may map fields in the data sets. For example, when the content management device 122 receives a first data set from the ACR system 124 and a second data set from the ACR system 126, at least some of the data fields of the first data set and the second data set may be common to both the first data set and second data set. However, the common data fields may be located at different places in the first data set and second data set. In this example, the content management device 122 may map the different data fields of the first data set and the second data set to normalized fields. When the content management device 122 maps the data fields, the same data fields are mapped to the same data field locations in the database 123.

In another embodiment, to normalize disparate data sets from the ACR systems 124 and 126, the content management device 122 may derive data from the data sets. For example, data from the ACR systems 124 and 126 may not include all of the fields that are needed to fill the data fields in the database. However, the content management device 122 may use other fields in the data sets from the ACR systems 124 and 126 to derive data for these data fields.

In one example, the database 123 may include data fields for a state in a country field, a designated market area (DMA) field, and a county and/or city field, but the data sets from the ACR systems 124 and 126 may only include zone improvement plan (ZIP) codes. In this example, the content management device 122 may use the ZIP codes to derive data for the fields in the database. In another example, the data set may not include any geographic location information, but may include an internet protocol (IP) address of the ACR systems 124 and 126. In this example, the content management device 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content management device 122 with the IP address of the electronic devices 115. The content management device 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content management device 122 may convert the local time to UTC before storing the data in the database 123.

In one embodiment, the content management device 122 may use the normalized data to generate reports or data about user's viewing behavior (viewing data) across different ACR technology vendors and smart TVs or other Internet-connected video devices. The content management device 122 and the electronic devices 115 may include communication interfaces to communicate information, such as overlay content, between the electronic devices 115 and the content management device 122. In one example, the communication interface may communicate the information using a cellular network and/or a wireless network. In one example, the communication network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network may be a wireless network (such as a network using Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communication network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network may be a ZigBee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content management device 122 may instruct the electronic devices 115 to replace segments of the local content feed received from the OTA broadcaster 108 or the MVPD 110 with overlay content. In another example, the content management device 122 may instruct the electronic devices 115 to overlay or superimpose overlay content onto segments of the local content feed. The content management device 122 may aggregate ACR event information across multiple ACR systems 124 and 126 and may communicate overlay content to different electronic devices 115 (such as electronic devices from different device manufacturers).

The content management device 122 may also establish communication connections with other devices 116. In one example, the other devices 116 may communicate with the electronic devices 118 and 120 and provide an additional screen (e.g., a second screen) to display overlay content. For example, the electronic devices 118 and 120 may receive the local content feed from the OTA broadcaster 108 or the MVPD 110 and display the local content feed to a viewer. The other devices 116 may also communicate ACR event information to the ACR systems 124 and 126 when an ACR event occurs, as discussed in the preceding paragraphs. When the content management device 122 receives the ACR event information, the content management device 122 may communicate overlay content to the other devices 116.

In one example, the electronic devices 118 and 120 may continue to display the local content feed while the other devices 116 display the overlay content. In another example, the electronic devices 118 and 120 and the other devices 116 may both display the overlay content. In another example, the electronic devices 118 and 120 and the other devices 116 may display a segment of the overlay content and a segment of the local content feed. In another example, the electronic devices 118 and 120 and the other devices 116 may display different local content feeds and different overlay content.

In one example, the electronic devices 118 and 120 and/or the other devices 116 may display the overlay content at the time the electronic devices 118 and 120 and/or the other devices 116 receive the overlay content. In another example, the electronic devices 118 and 120 and/or the other devices 116 may delay displaying the overlay content for a threshold period of time. In one embodiment, the threshold period of time may be a predefined period of time. In another embodiment, the content management device 122 may select a period of time for the electronic devices 118 and 120 and the other devices 116 to delay displaying the overlay content.

Figure 2A:
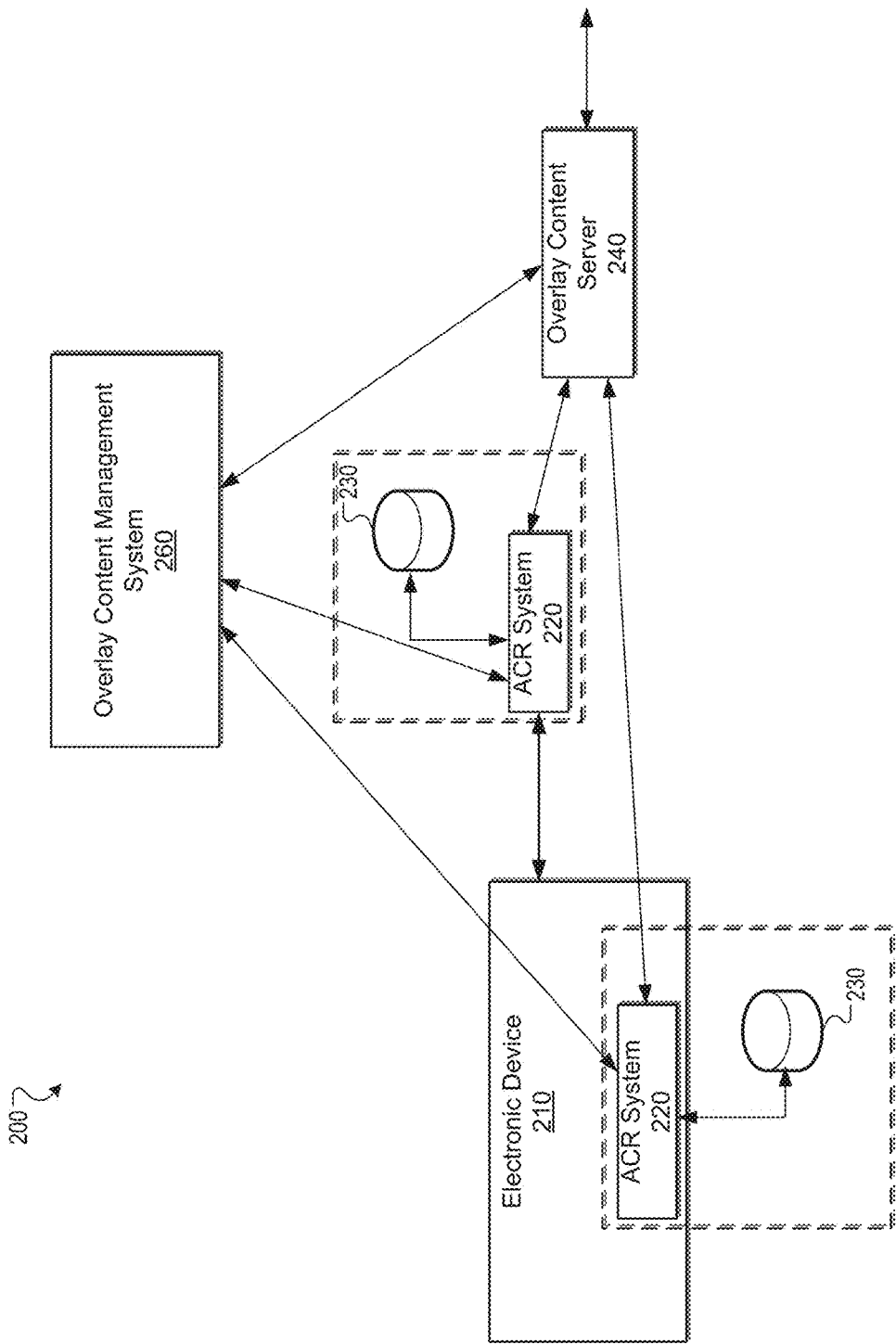
FIG. 2A illustrates an example system diagram of a content overlay network.

FIG. 2A illustrates a system diagram of a content overlay network 200 according to one embodiment. The content overlay network 200 can include an electronic device 210, a first ACR system 220, a content database 230, an overlay content server 240, a record database 250, and an overlay content management system 260. The ACR system 220 provides broadcast digital content to the electronic device 210. The broadcast digital content can include overlay content the ACR system 220 superimposes or overlays on top of media segments for the electronic device 210 to display to a viewer. A media segment can be a segment or portion of the media content. For example, the media segment can be a segment or portion of the media content for a TV show or a movie, such as a TV show clip or movie clip. In another example, the media segment of the media content can be a commercial that is part of the media content for the TV show or the movie.

In one embodiment, the ACR system 220 is integrated into the electronic device 210. In another embodiment, the ACR system 220 is coupled to the electronic device 210. In one example, the ACR system 220 can be directly coupled to the electronic device 210 using an input port of the electronic device 210. For example, the ACR system 220 is a High-Definition Media Interface (HDMI) dongle that plugs into an HDMI input terminal of the electronic device 210. In this example, the ACR system 220 can include an HDMI input port, an HDMI output port, and a network interface to receive broadcast content or media segments from a content provider. In another example, the ACR system 220 can be indirectly coupled to the electronic device 210 via another device that is coupled to the electronic device 210, such as an audio and/or video (A/V) device.

The electronic device 210 can use the ACR system 220 to display targeted or personalized overlay content segment to viewers. The overlay content segment can be an audio segment, a video segment, and/or a graphical segment of content. In one example, the overlay content segment can be a media object or file that includes an audio segment or a video segment of content that is a replacement AD. In another example, overlay content segment is an audio segment or video segment of a larger audio object or a larger video object that includes other overlay content segments.

In one embodiment, the ACR system 220 can use digital watermarking to ACR broadcast content. For digital watermarking, a content provider or a broadcaster can process the broadcast content to insert watermark data within a content signal prior to broadcast the content signal. The electronic device 210 or the ACR system 220 can detect the watermark data to identify and synchronize media segments with the broadcast content.

In another embodiment, the ACR system 220 can identify media content of the broadcast content, using content fingerprinting, as the electronic device displays the media content. The content fingerprinting can include the ACR system 220 matching a sequence of content fingerprints for media content the electronic device 210 is displaying with of stored fingerprints in a reference database. An advantage of content fingerprinting can be to process the media segment while the media segment is being broadcasted (e.g. live processing) or within a threshold period of time, such as several seconds, after the media segment is broadcast (e.g. substantially live processing). The content overlay network 200 can adjust overlay content segments, as the electronic device 210 displays the content, based on viewer behavior during a content broadcast (e.g. live or substantially live adjustments). In one example, the viewer behavior can include the electronic device 210 receiving a command from a user device to change a channel or to pause a display of media content. In another example, the viewer behavior can include the electronic device 210 receiving a command from the user device to display time-shifted content. As the viewers select or change the content, the content overlay network 200 can switch what overlay content is superimposed onto the media content.

The overlay content server 240 is coupled to the ACR system 220. The overlay content server 240 can receive overlay content from a content provider or advertiser. The overlay content server 240 can store media segments, overlay content segments, and format information for the media segments and overlay content segments. The overlay content server 240 can send media segments to the electronic device 210 in a select overlay format of the overlay formats.

The record database 250 is coupled to the overlay content server 240. The record database 250 can maintain a record of the media segments or overlay content segments that the electronic device 210 displays. In one embodiment, the electronic device 210 has a unique identifier (UID) associated with it that uniquely identifies the electronic device 210. The UID can also be associated with media segments or overlay content segments to indicate what media segments or overlay content segments the electronic device 210 has displayed.

In another embodiment, the record database 250 can receive a message from the overlay content server 240. In one example, the message can include a media segment ID that identifies a media segment and a UID that is associated with the media segment ID. In another example, the message can include an overlay content segment ID that identifies an overlay content segment and a UID that is associated with the overlay content segment ID. The record database 250 can store various media segment IDs and overlay content segment IDs with their associated UIDs for subsequent lookups by the overlay content server 240. The overlay content server 240 can search the record database 250 to determine when a media segment or overlay content segment associated with a respective media segment ID or overlay content segment ID has previously been displayed on the electronic device 210 with the UID.

In one embodiment, the overlay content management system 260 can include an input device to receive configuration information for a sequence of media segments and overlay content segments. In one example, the input device can be a software interface (such a web portal) on an electronic device, where a user can input configure information to configure the sequence of media segments and overlay content segments at the overlay content server 240. For example, the overlay content management system 260 can be an end-user accessible website for creating, viewing, updating, and deleting overlay content and replacement videos.

In one example, the user can use the input device to set rules or criteria for the overlay content server 240 to use to select an overlay content segment of an overlay content set. In one embodiment, the rules or criteria can include a sequence for displaying of items in an overlay content set, such as media content and overlay content segments. In another embodiment, the rules or criteria can include displaying different overlay content segments in view of demographic information of a user. In one example, when the user is a male, the electronic device 210 may display selected overlay content segments. In another example, when the user is a female, other overlay content segments may be displayed. In another embodiment, the rules or criteria can include displaying different overlay content segments in view of a time of day. For example, in the morning the electronic device 210 can display overlay content segments related to breakfast, in the evening the electronic device 210 can display overlay content segments related to dinner, and in the night time the electronic device 210 can display overlay content segments related to adult themes. In another embodiment, the overlay content server 240 can include an input device to receive configuration information to order media content and overlay content segments in a linear sequence. For example, a user can use a graphical user interface (GUI) to send configuration information to the overlay content server 240 to order the sequence of the media segments and overlay content segments.

Figure 2B:
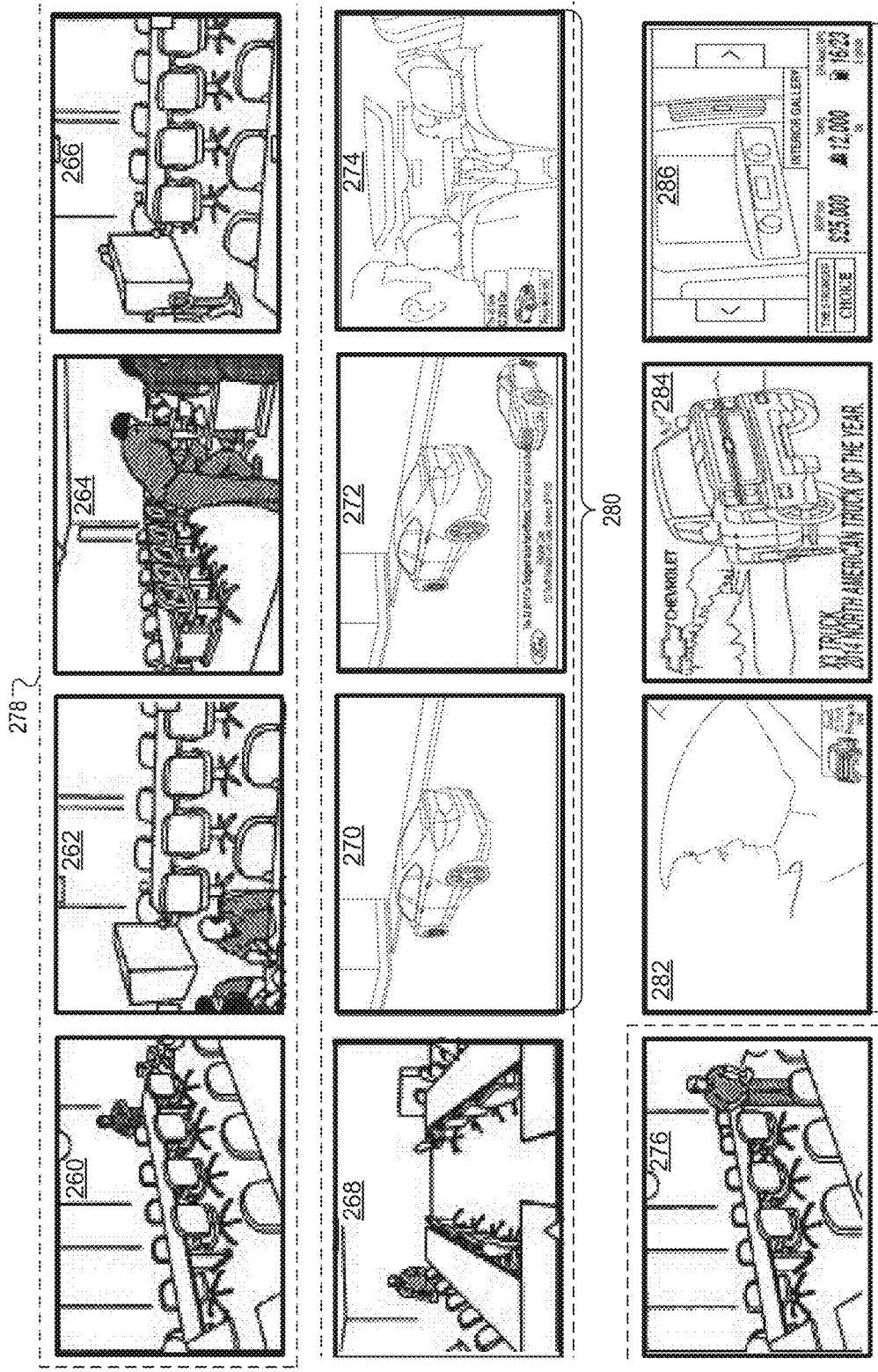
FIG. 2B illustrates example media content with a media segment.

FIG. 2B illustrates media content 278 with a media segment 280 according to one embodiment. Some numbers in FIG. 2B are similar to some numbers in FIG. 2A as noted by similar reference numbers, unless expressly described otherwise. In one embodiment, the ACR system 220 can use fingerprinting to identify the media content 278, as discussed in the preceding paragraphs. The media content 278 can include frames 260-276. Frames 270-274 can be the media segment 280 that is a segment of portion of the media content 278. In one embodiment, the frames 260-268 and 276 can be frames in the media content 278 that are part of a TV show or movie and the frames 270-274 and the frames 270-274 in the media segment 280 can be a commercial or AD that is integrated into the TV show or movie. In one example, the media segment 280 is a commercial that is integrated into a TV show or movie which is broadcast or streamed to the electronic device 210. In another example, the media segment 280 can be a segment or portion of the TV show or a movie, such as a TV show clip or movie clip. In another embodiment, the overlay content server 240 can determine that the media segment 280 was previously displayed on the electronic device 210 and the ACR system 220 can replace the media segment 280 with the overlay content segment 288, as discussed in greater detail in the proceeding paragraphs. The overlay content segment 288 can include frames 282-286. In one example, the overlay content segment 288 can be a replacement AD that the ACR system 220 overlays or superimposes on top of the frames 270-274 in the media segment 280. In one another, the overlay content segment 288 can be a replacement AD that the ACR system 220 replaces the frames 270-274 of media segment 280 with the frames 282-286. The number of frames and the number of media segments in media content are not intended to be limiting. For example, the media content 278 can include multiple media segments 280 that can have varying numbers of frames.

Figure 3A:
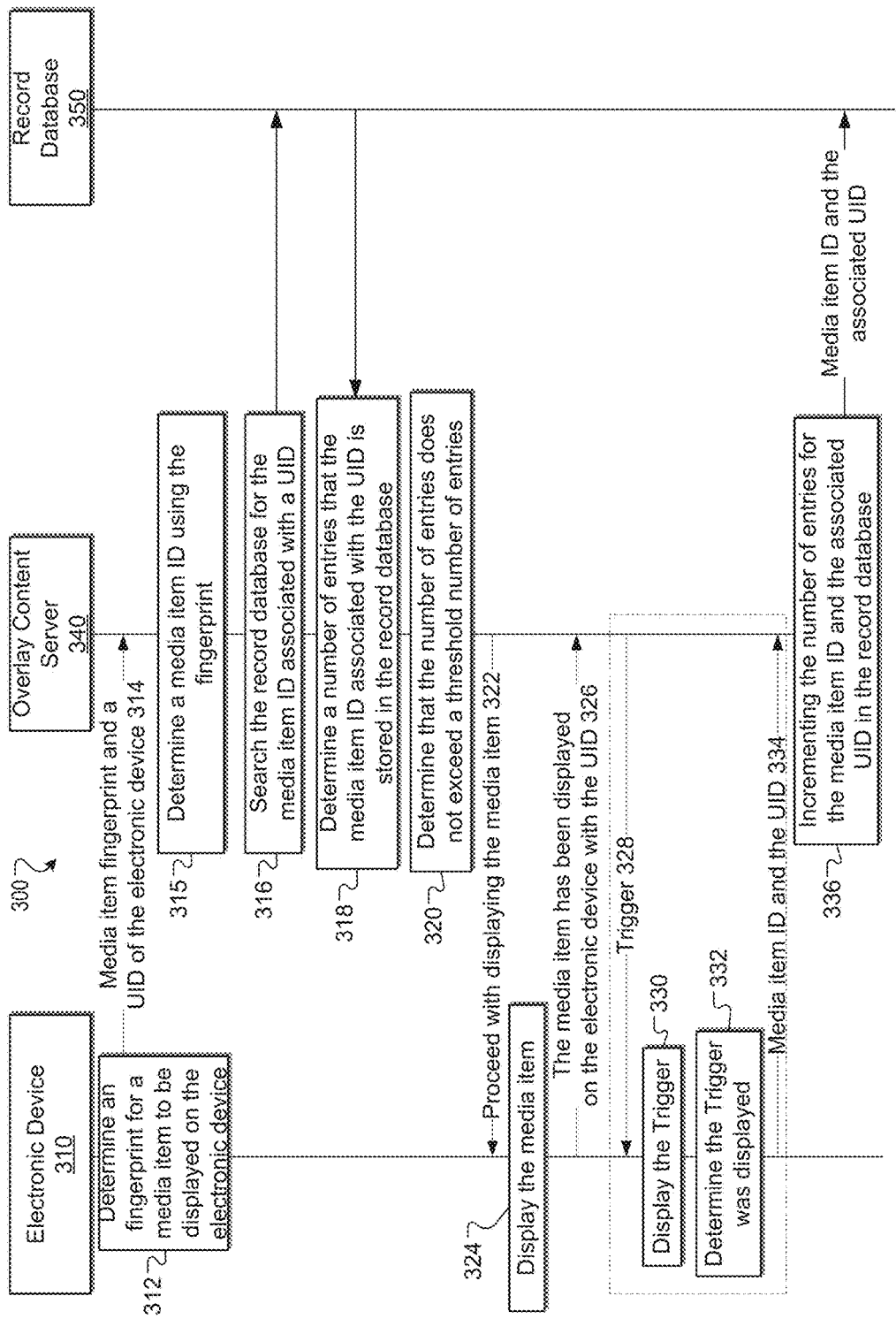
FIG. 3A illustrates a diagram of an example method for determining when to replace a media segment that has previously been displayed on an electronic device.

FIG. 3A illustrates a diagram of a method 300 for determining when to replace a media segment that has previously been displayed on an electronic device 310 a threshold number of times according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. The method 300 may be performed by all or part of the content distribution network 100 of FIG. 1 or all or part of the content overlay network 200 of FIG. 2. For example, the method 300 may be performed by processing logic of the electronic device 210 (FIG. 2), the processing logic of the ACR system 220 (FIG. 2), or the processing logic of the overlay content server 240 (FIG. 2).

Referring to FIG. 3A, the method 300 begins with the electronic device 310 determining a fingerprint for a media segment to be displayed on the electronic device (312). In one example, the media segment can be part of the media content the electronic device 310 receives from a broadcaster or content provider. In another example, the electronic device 310 can receive the overlay content from the overlay content server 240. In another example, the electronic device 310 can have a first automatic content recognition (ACR) system and be connected to the overlay content server via a first network connection. The electronic device 310 can receive media content from a content source device (such as a broadcaster) over a second network connection between the content source device and the electronic device 310. In one embodiment, a network connection can be a wired communication channel to communicate data, such as a communication channel via an Ethernet cable or a coaxial cable. In another embodiment, the network connection can be a wireless communication channel to communicate data, such as a cellular communication channel or a WLAN communication channel.

The method can also include the electronic device 310 sending a message to the overlay content server 340 (314). The message can include the fingerprint and a UID associated with the electronic device 310. The method can include an overlay content server 340 determining a media segment ID for the media segment using the fingerprint (315). For example, the overlay content server 340 can search a database for the fingerprint and identify the media segment ID that correlates with the fingerprint. The media segment ID can include information associated with the media segment, such as a subject matter of the media segment, a play length of the media segment, a display resolution level of the media segment, and so forth. The method can include the overlay content server 340 searching the record database 350 for the media segment ID associated with the UID (316).

The method can include the overlay content server 340 determining a count stored in the record database 350 for the media segment ID associated with the UID (318). The count can be a number indicating a number of times the electronic device 310 has displayed a media segment or a content overlay segment. In one example, the count can be a total number of entries in the record database 350 for the media segment ID, where each time the electronic device 310 display the media segment, the overlay content server 340 can store an entry in the record database 350 can includes the media segment ID and the UID. In another example, the count can be a single entry that includes a number that the overlay content server 340 increments each time the electronic device 310 displays the media segment or content overlay segment. The method can include determining that the count does not exceed a threshold count using the overlay content server 340 (320).

In one example, a system administrator or an overlay content provider (such as an advertiser) can set a threshold count via an input device. For example, the system administrator or the overlay content provider can use a graphical user interface (GUI) on an electronic device to send the overlay content server 340 configuration data for the threshold count. In another example, the threshold count can be set when the media segment or overlay content segments are uploaded or stored in a database coupled to the overlay content server 340. In another example, the threshold count can be set when the media segment or overlay content segments are uploaded or stored to the overlay content server 340. In another example, different thresholds for the count can be set for different media segments or overlay content segments. For example, the overlay content server 340 can use rules or criteria to set different thresholds (e.g., threshold rules or criteria) for media segments or overlay content segments in view of demographic information of the viewer. For example, when the viewer is a male, a first threshold is used to display media segments a defined number of times, and when the viewer is a female, a second threshold is used to display media segments a different number of times. In another embodiment, the rules or criteria can include setting different thresholds in view of a time of day. For example, in the morning a first threshold can be used, in the evening a second threshold can be used, and at night a third threshold can be used.

The method can include the overlay content server 340 sending a notification to the electronic device 310 instructing the electronic device 310 to display the media segment (322). The method can include the electronic device 310 displaying the media segment on a display of the electronic device 310 in response to the electronic device 310 receiving the notification (324). When the electronic device 310 does not receive a notification before the media segment is scheduled to be displayed, the electronic device 310 will display the media segment. In one example, the overlay content server 340 can send a configuration setting to the electronic device instructing 310 instructing the electronic device 310 to display the media segment when the electronic device 310 does not receive the notification before the media segment is scheduled to be displayed.

The method can include the electronic device 310 sending a notification to the overlay content server 340 that the media segment has been displayed on the electronic device 310 (326). In one embodiment, the method can include, in response to receiving the notification, the overlay content server 340 incrementing the count associated with the media segment ID and the UID in the record database 350 (336). For example, each time the electronic device 310 displays the media segment, the overlay content server 340 can increment the count recorded for the media segment ID and the associated UID in the record database 350.

In another embodiment, the overlay content server 340 can determine that the media segment has been displayed using a trigger. In this embodiment, the method can include the overlay content server 340 sending a trigger to the electronic device 310 when the overlay content server 340 has received the notification (328). The method can include the electronic device 310 displaying the trigger (330). In one embodiment, the trigger can be an invisible overlay the electronic device 310 displays in response to the ACR system 220 (FIG. 2) determining that the electronic device 310 displayed a particular media segment or is currently displaying on the particular media segment. In another embodiment, the trigger is a web request pointing to a specific endpoint on the overlay content server 340 (FIG. 2). The method can include the ACR system 220 of the electronic device 310 determining that the trigger was displayed (332). The method can include the electronic device 310 sending a notification with the media segment ID and the UID to the overlay content server 340 when the electronic device 310 has displayed the trigger (334). The method can include the overlay content server 340 incrementing the count for the media segment ID and the associated UID in the record database 350 (336). For example, each time the media segment is displayed on the electronic device 310, the overlay content server 340 can increment the count recorded for the media segment ID and the associated UID in the record database 350.

Figure 3B:
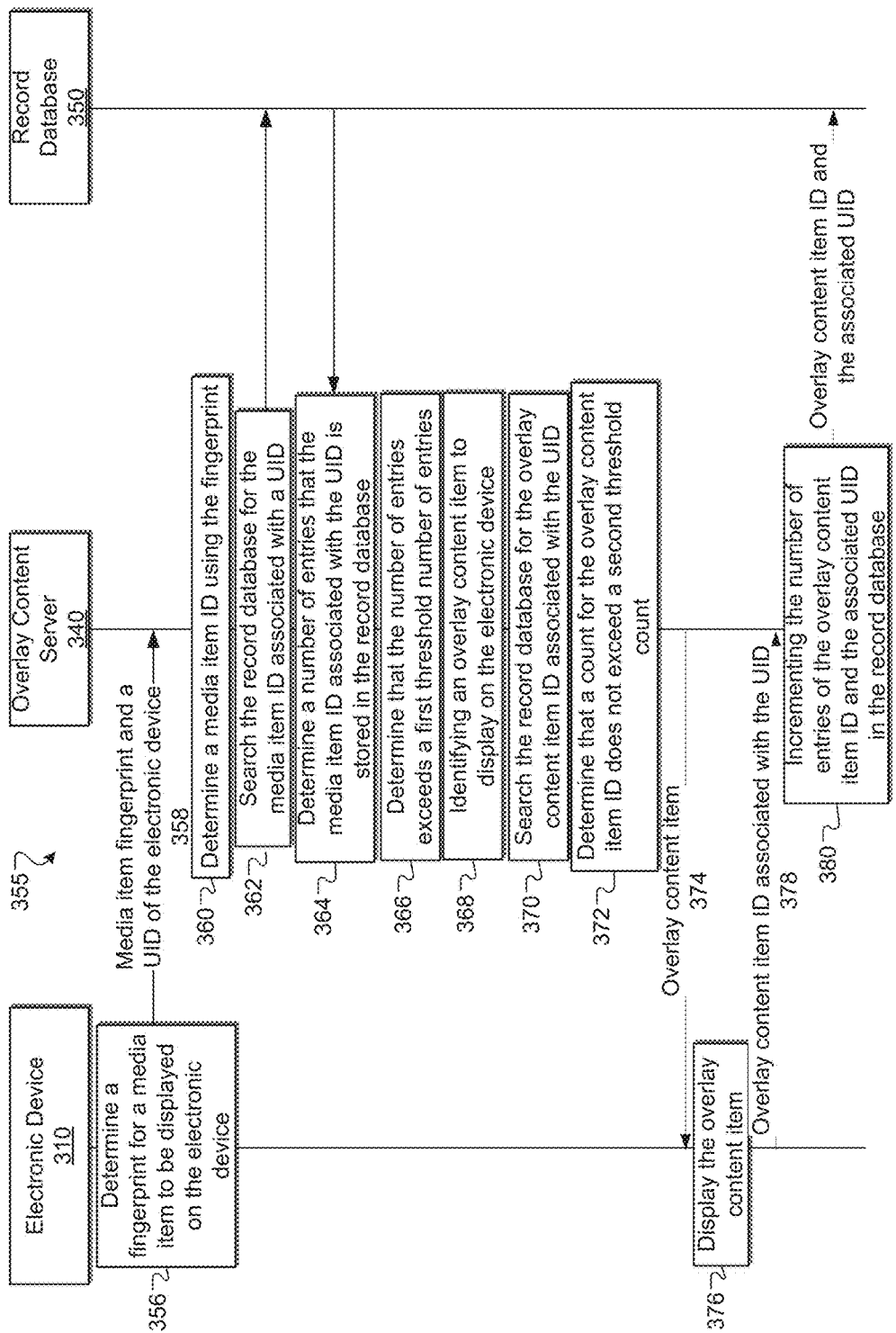
FIG. 3B illustrates a diagram of an example a method of checking when a media segment has previously been displayed on an electronic device.

FIG. 3B illustrates a diagram of a method 355 for replacing a media segment with an overlay content segment when an electronic device 310 has previously displayed the media segment a threshold count according to one embodiment. The method 355 may at least partially be performed by processing logic that includes hardware (e.g., circuitry, dedicated logic, programmable logic, microcode, etc.), software (e.g., instructions executed by a processing device), firmware or a combination thereof. The method 355 may be performed by all or part of the content distribution network 100 of FIG. 1 or all or part of the content overlay network 200 of FIG. 2. The method 355 may be performed by processing logic of the electronic device 210 (FIG. 2), the processing logic of the ACR system 220 (FIG. 2), or the processing logic of the overlay content server 240 (FIG. 2).

Referring to FIG. 3B, the method 355 begins with the electronic device 310 determining a fingerprint for a media segment to be displayed on the electronic device 310 (356). The method can also include sending a message from the electronic device 310 to the overlay content server 340 (358). The message can include the fingerprint and a UID associated with the electronic device 310. The method can include determining a media segment ID for the media segment using the fingerprint (360). For example, the overlay content server 340 can search a database for the fingerprint and identify the media segment ID that correlates with the fingerprint. The media segment ID can include information associated with the media segment, such as a subject matter of the media segment, a play length of the media segment, a display resolution level of the media segment, and so forth. The method can include the overlay content server 340 searching the record database 350 for the media segment ID associated with the UID (362).

The method can include the overlay content server 340 determining that a count for the media segment ID and the associated UID that are stored in the record database 350 (364). The count associated with the media segment ID and the UID can indicate a number of times the electronic device 310 has displayed the media segment associated with the media segment ID on a display of the electronic device 310. The method can include the overlay content server 340 determining that the count exceeds the threshold count using the overlay content server 340 (366). The method can include the overlay content server 340 identifying an overlay content segment of an overlay content set to display on the electronic device 310 when the count exceeds the threshold count for the media segment ID (368).

The method can include the overlay content server 340 searching the record database 350 for the overlay content segment ID that is associated with the UID (370). The method can include the overlay content server 340 determining that the count in the record database 350 for the overlay content segment ID and the UID does not exceed a second threshold count. In one embodiment, the identifying the overlay content segment to display can include the overlay content server 340 verifying that a count in the record database 350 for an overlay content segment ID associated the overlay content segment to be displayed on the electronic device 310 does not exceed a threshold count (372). For example, the record database 350 not including an overlay content segment ID associated with the UID for the overlay content segment can indicate that the electronic device 310 has not previously displayed the overlay content segment.

In another embodiment, when the count in the record database 350 for the overlay content segment to display on the electronic device 310 exceeds the threshold count, the overlay content server 340 can iteratively search the record database 350 to identify an nth overlay content segment that does not exceed the threshold count. In one example, when the threshold count for a first overlay content segment is exceeded, the overlay content server 340 can sequentially search the record database 350 for a second overlay content segment ID associated with a second overlay content segment in the overlay content set, a third overlay content segment ID associated with a third overlay content segment in the overlay content set, a fourth overlay content segment ID associated with a fourth overlay content segment in the overlay content set, and so forth until the overlay content server 340 identifies an nth overlay content segment ID associated with an nth overlay content segment that does not exceed the threshold count. In this example, the overlay content server 340 can send the nth overlay content segment to the electronic device instead of the first overlay content segment.

In another example, the overlay content server 340 can search the record database 350 for a first entry that includes a media segment ID that is associated with the UID. The overlay content server 340 can determine that a first count in the record database 350 for the media segment ID associated with the UID exceed a first threshold count. The overlay content server 340 can identify a first overlay content segment and a first overlay content segment ID in a set of overlay content segments for the electronic device 310 to display. The overlay content server 340 can determine a second count associated with the first overlay content segment ID that is associated with the UID. The overlay content server 340 can determine that a second count in the record database 350 for the first overlay content segment ID associated with the UID exceed a second threshold count. The overlay content server 340 can identify a second overlay content segment and a second overlay content segment ID in the set of overlay content segments for the electronic device 310 to display. The overlay content server 340 can determine a third count for a second overlay content segment ID that is associated with the UID, where the second overlay content segment ID is an overlay content segment ID for the second overlay content segment. The overlay content server 340 can determine that the third count in the record database for the second overlay content segment ID associated with the UID does not exceed a third threshold count.

In one embodiment, when the threshold count has been exceed for each of the n overlay content segments, the overlay content server 340 can send an overlay content segment from another overlay content set to the electronic device 310. In this example, the overlay content server 340 can notify a user or administrator via an input device (such as a smartphone or a desktop computer) associated with the user or the administrator that an individual or company associated with the initial overlay content set should receive a refund for a payment associated with the overlay content server 340 sending the media segment and/or the overlay content segments to the electronic device 310 for display. In another example, when the threshold count has been exceed for each of the n overlay content segments, the overlay content server 340 can send an overlay content segment from a different overlay content set to the electronic device 310. In this example, the overlay content server 340 can send a refund notification to the device associated with a user or administrator. For example, the user or administrator can be an individual or a representative of a company associated with the overlay content segment or set. The refund notification indicates that the overlay content segments in the overlay content segment set have been displayed on the electronic device 310 prior to a threshold number of overlay slots being used for the user. In this example, the individual or the representative that provided the initial overlay content set can receive a refund for a payment associated with the overlay content server 340 finishing sending the media and overlay content segments from the overlay content set to the electronic device 310 for display.

In another example, when the threshold count for the media segment and each of the overlay content segments has been exceeded, the overlay content server 340 can reset the count for the associated media segment ID and the overlay content segment IDs to zero. When the count has been reset, the overlay content server 340 can start over in a sequence of showing the media segment and the overlay content segments in the set of overlay content segments.

The method can include sending the overlay content segment from the overlay content server 340 to the electronic device 310 (374). The method can include the electronic device 310 displaying the overlay content segment (376). In one example, the electronic device 310 can display the overlay content segment by overlaying or superimposing the overlay content segment over the media segment. The method can include the overlay content server 340 sending a notification to the overlay content server 340 when the electronic device 310 has displayed the overlay content segment (378). The notification can include the overlay content segment ID and the UID. The method can include incrementing a count for the overlay content segment ID and the associated UID when the notification is received by the overlay content server 340 (380). Alternatively, the overlay content server 340 can increment the count when the overlay content server 340 sends the overlay content segment to the electronic device 310. The preceding example illustrates displaying the overlay content segment on the electronic device 310. However, this exemplary method is not intended to be limiting. The method 355 can be an iterative method where the media segment and overlay content segments in overlay content set can be sequentially overlayed over previously displayed media segments and overlay content segments. Additionally, an order of the overlay content segments in overlay content set can be sequential, random, or any other defined order.

Figure 4:
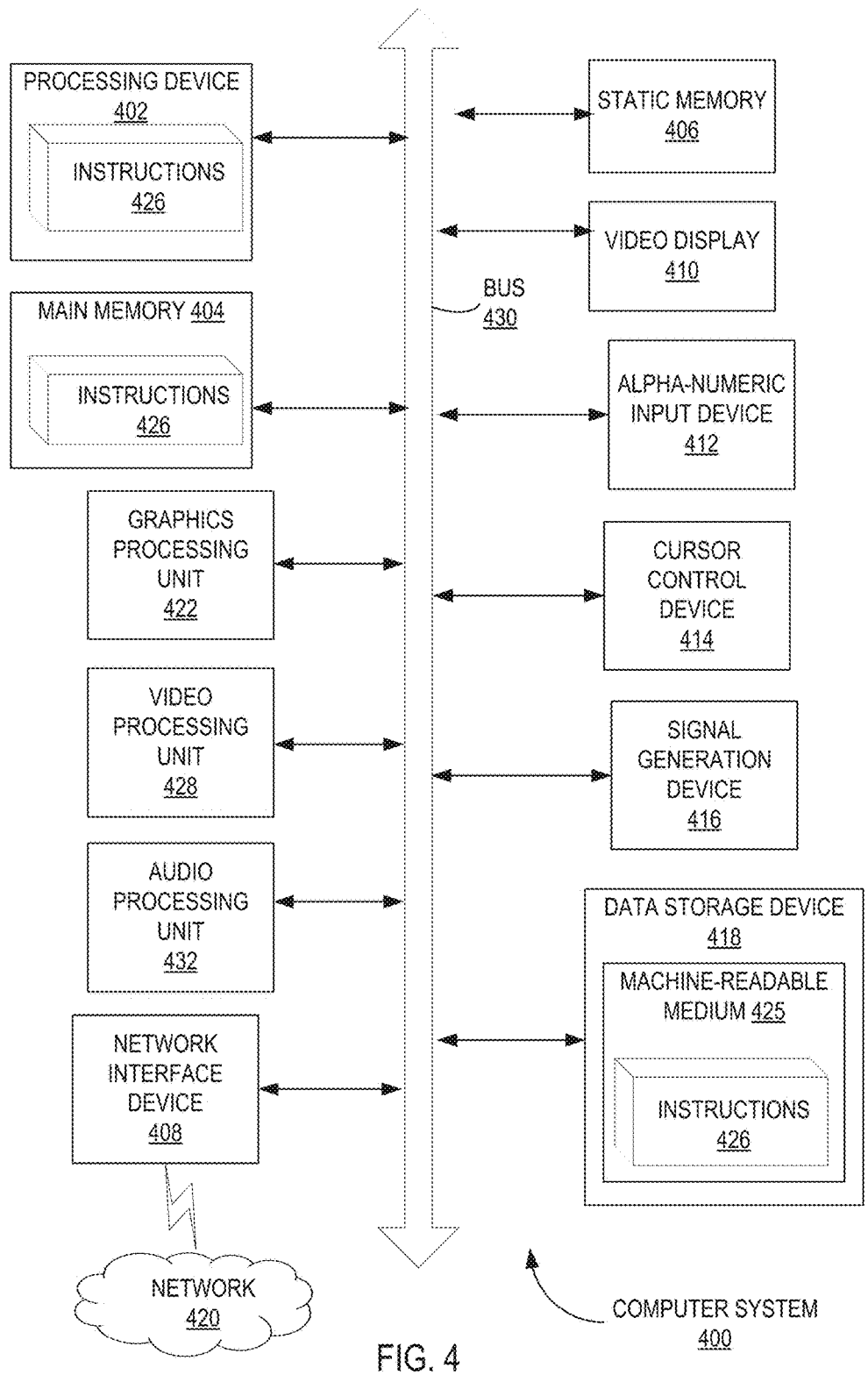
FIG. 4 illustrates a diagrammatic representation of a machine in the example form of a computer system within which a set of instructions, for causing the machine to perform any one or more of the methodologies discussed herein, may be executed.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or an electronic device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 may correspond to the ACR fingerprinter server 105 of FIG. 1. The computer system 400 may correspond to all or part of the content distribution network 100 of FIG. 1 or to all or part of the content overlay network 200 of FIG. 2. The computer system 400 may correspond to at least a portion of a cloud-based computer system such as discussed herein.

The computer system 400 includes: a processing device 402; a main memory 404, such as a read-only memory (ROM); flash memory; dynamic random access memory (DRAM), such as synchronous DRAM (SDRAM) or DRAM (RDRAM); a static memory 406, such as flash memory or static random access memory (SRAM); and a data storage device 418. The processing device 402, the main memory 404, the flash memory, the dynamic random access memory (DRAM), the static memory 406, and the data storage device 418 can communicate with each other via a bus 430.

Processing device 402 represents one or more processing devices. For example, one or more processing devices can be a microprocessor, central processing unit, or the like. More particularly, the processing device 402 may be a complex instruction set computing (CISC) microprocessor, a reduced instruction set computer (RISC) microprocessor, a very long instruction word (VLIW) microprocessor, a processor implementing other instruction sets, or a processor implementing a combination of instruction sets. The processing device 402 may also be one or more special-purpose processing devices. For example, the special-purpose processing devices can be an application specific integrated circuit (ASIC), a field programmable gate array (FPGA), a digital signal processor (DSP), network processor, or the like. In one embodiment, processing device 402 may include one or more processing cores. The processing device 402 may be configured to execute the instructions 426 of a mirroring logic stored in the main memory 404 for performing the operations discussed herein.

The computer system 400 may further include a network interface device 408 communicably coupled to a network 420. The computer system 400 also may include: a video display unit 410, such as a liquid crystal display (LCD) or a cathode ray tube (CRT); an alphanumeric input device 412, such as a keyboard; a cursor control device 414, such as a mouse; a signal generation device 416, such as a speaker; or other peripheral devices. Furthermore, the computer system 400 may include a graphics processing unit 422, a video processing unit 428, and an audio processing unit 432. In another embodiment, the computer system 400 may include a chipset, which refers to a group of integrated circuits, or chips, that is designed to work with the processing device 402. The chipset may control communications between the processing device 402 and external devices. For example, the chipset may be a set of chips on a motherboard that links the processing device 402 to high-speed devices, such as main memory 404 and graphic controllers, as well as linking the processing device 402 to lower-speed peripheral buses of peripherals, such as a universal serial bus (USB), a peripheral component interconnect (PCI), or industry standard architecture (ISA) buses.

The data storage device 418 may include a computer-readable storage medium 425 that stores instructions 426. The instructions 426 may embody any one or more of the methodologies of functions described herein. The instructions 426 may also reside, completely or at least partially, within the main memory 404 and/or within the processing device 402 during execution thereof by the computer system 400. The main memory 404 and the processing device 402 may be computer-readable storage media.

The computer-readable storage medium 425 may store instructions 426 utilizing logic and/or a software library containing methods that call the above applications. While the computer-readable storage medium 425 is shown in an example embodiment to be a single medium, the term "computer-readable storage medium" or "computer-readable medium" is not intended to be limiting. The "computer-readable storage medium" or "computer-readable medium" can be a single medium or multiple media, such as a centralized or distributed database, and/or associated caches and servers, that store the one or more sets of instructions. The term "computer-readable storage medium" can include any medium that is capable of storing, encoding or carrying a set of instruction for execution by the machine and that cause the machine to perform any one or more of the methodologies of the present embodiments. The term "computer-readable storage medium" can include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or laptops and may also be used in other devices, such as handheld devices, tablets, other thin notebooks, systems on a chip (SOC) devices, and embedded applications. Some examples of handheld devices include cellular phones, Internet protocol (IP) devices, smartphones, digital cameras, personal digital assistants (PDAs), and handheld personal computers (PCs). Embedded applications can include microcontrollers, digital signal processors (DSPs), SoCs, network computers (NetPC), set-top boxes, network hubs, wide area network (WAN) switches, or other systems that may perform the functions and operations, as discussed in the proceeding paragraphs.

Although the embodiments described herein may refer to a processor or processing device, other embodiments are applicable to other types of integrated circuits and logic devices. Similar techniques and teachings of embodiments may be applied to other types of circuits or semiconductor devices that may benefit from higher pipeline throughput and improved performance. The embodiments herein are applicable to any processor or machine that performs data manipulations. However, the embodiments are not limited to processors or machines that perform 512 bit, 256 bit, 128 bit, 64 bit, 32 bit, and/or 16 bit data operations and may be applied to any processor and machine in which manipulation or management of data is performed.

The embodiments herein provide examples, and the accompanying drawings show various examples for the purposes of illustration. However, these examples should not be construed to be limiting, as they are merely intended to provide examples of embodiments rather than to provide an exhaustive list of all possible implementations of embodiments.

Some portions of the detailed description are presented in terms of algorithms and symbolic representations of operations on data bits within a computer memory. These algorithmic descriptions and representations are used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

The terms in the preceding paragraphs and similar terms are to be associated with the appropriate physical quantities and are merely convenient labels applied to these quantities. Unless specifically stated otherwise as apparent from the preceding paragraphs and figures, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system registers and memories into other data similarly represented as physical quantities within the computing system memories, computer system registers, other information storage devices, other transmission devices, or electronic devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMS), erasable programmable read only memories (EPROMs), electrically erasable programmable read only memories (EEPROMs), magnetic or optical cards, flash memory, or any type of media suitable for storing electronic instructions. The term "computer-readable storage medium" can include a single medium or multiple mediums that store the one or more sets of instructions. The single medium or multiple mediums can be centralized or distributed databases and/or associated caches and servers. The term "computer-readable medium" can include any medium that is capable of storing, encoding or carrying a set of instructions for execution by the machine and that causes the machine to perform any one or more of the methodologies of the embodiments herein. The term "computer-readable storage medium" can include, but not be limited to, solid-state memories, optical media, magnetic media, or any medium that is capable of storing a set of instructions for execution by the machine and that causes the machine to perform any one or more of the methodologies of the embodiments herein.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description in the proceeding paragraphs. In addition, the embodiments herein are not described with reference to any particular programming language. It will be appreciated that a variety of programming languages may be used to implement the teachings of the embodiments herein.

The preceding description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the embodiments herein. Thus, the specific details set forth above are merely exemplary. Particular implementations may vary from these exemplary details and still be contemplated to be within the scope of the present embodiments.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at a data processing device, a fingerprint of a media segment to be displayed on a media device;
   receiving, at the data processing device, a media device identifier;
   determining, by the data processing device, a media segment identifier for the media segment using the fingerprint;
   querying, by the data processing device, a data source using the media device identifier and the media segment identifier to obtain a display count tracking the number of times the media segment has been displayed on the media device;
   sending a trigger from the data processing device to the media device;
   receiving, at the data processing device, a notification from the media device, the notification comprising the media device identifier and the media segment identifier;
   incrementing the display count in response to receiving the notification;
   determining, by the data processing device, a number of times the media segment has been displayed on the media device based on at least the display count;
   determining, by the data processing device, whether the number of times the media segment has been displayed on the media device satisfies a threshold criterion; and
   when the number of times the media segment has been displayed on the media device satisfies the threshold criterion:
     identifying, by the data processing device, an overlay content segment to be displayed on the electronic device in lieu of the media segment; and
     instructing, by the data processing device, the media device to display the overlay content segment in lieu of the media segment.

2. The method of claim 1, further comprising, when instructing the media device to display the overlay content segment in lieu of the media segment, incrementing a display count tracking the number of times the media segment has been displayed on the media device.

3. The method of claim 1, further comprising:
   receiving, at the data processing device, a notification from the media device indicating that the media device displayed the overlay content segment; and
   in response to receiving the notification, incrementing, by the data processing device, a display count tracking the number of times the media segment has been displayed on the media device.

4. The method of claim 1, wherein the threshold criterion is satisfied when the number of times the media segment has been displayed on the media device is greater than a first count.

5. The method of claim 4, wherein the threshold criterion is satisfied when the number of times the media segment has been displayed on the media device is less than a second count, the second count being greater than the first count.

6. The method of claim 1, wherein sending the trigger comprises sending an invisible overlay to the media device for the media device to display.

7. The method of claim 1, wherein sending the trigger comprises sending a web request to the media device, wherein the web request points to the data processing device.

8. A system comprising:
   data processing hardware; and
   memory hardware in communication with the data processing hardware, the memory hardware storing instructions that when executed on the data processing hardware cause the data processing hardware to perform operations comprising:
     receiving a fingerprint of a media segment to be displayed on a media device;
     receiving, at the data processing device, a notification from the media device indicating that the media device displayed the overlay content segment;
     in response to receiving the notification, incrementing, by the data processing device, a display count tracking the number of times the media segment has been displayed on the media device;
     determining a number of times the media segment has been displayed on the media device based on at least the display count;
     determining whether the number of times the media segment has been displayed on the media device satisfies a threshold criterion; and when the number of times the media segment has been displayed on the media device satisfies the threshold criterion:
  identifying an overlay content segment to be displayed on the electronic device in lieu of the media segment; and
  instructing the media device to display the overlay content segment in lieu of the media segment.

9. The system of claim 8, wherein determining the number of times the media segment has been displayed on the media device comprises:
  receiving a media device identifier;
  determining a media segment identifier for the media segment using the fingerprint; and
  querying a data source using the media device identifier and the media segment identifier to obtain a display count tracking the number of times the media segment has been displayed on the media device.

10. The system of claim 9, wherein the operations further comprise:
  sending a trigger from the data processing device to the media device;
  receiving a notification from the media device, the notification comprising the media device identifier and the media segment identifier; and
  incrementing the display count in response to receiving the notification.

11. The system of claim 10, wherein sending the trigger comprises sending an invisible overlay to the media device for the media device to display.

12. The system of claim 10, wherein sending the trigger comprises sending a web request to the media device, wherein the web request points to the data processing device.

13. The system of claim 8, wherein the operations further comprise, when instructing the media device to display the overlay content segment in lieu of the media segment, incrementing a display count tracking the number of times the media segment has been displayed on the media device.

14. The system of claim 8, wherein the threshold criterion is satisfied when the number of times the media segment has been displayed on the media device is greater than a first count.

15. The system of claim 14, wherein the threshold criterion is satisfied when the number of times the media segment has been displayed on the media device is less than a second count, the second count being greater than the first count.

16. An overlay content server device comprising:
  a first network connection to a media device configured to execute an automatic content recognition (ACR) system, wherein the media device is configured to receive media content that comprises a plurality of media segments from a content source device over a second network connection between the content source device and the media device, wherein the ACR system is configured to generate a fingerprint for a media segment of the plurality of media segments;
  a third network connection to a data source; and
  a data processing device coupled to the first network connection and the third network connection, the data processing device configured to perform operations comprising:
    receiving a fingerprint of a media segment to be displayed on a media device;
    receiving, at the data processing device, a media device identifier;
    determining, by the data processing device, a media segment identifier for the media segment using the fingerprint;
    querying, by the data processing device, a data source using the media device identifier and the media segment identifier to obtain a display count tracking the number of times the media segment has been displayed on the media device;
    sending a trigger from the data processing device to the media device;
    receiving, at the data processing device, a notification from the media device, the notification comprising the media device identifier and the media segment identifier;
    incrementing the display count in response to receiving the notification;
    determining a number of times the media segment has been displayed on the media device based on at least on the display count;
    determining whether the number of times the media segment has been displayed on the media device satisfies a threshold criterion; and
    when the number of times the media segment has been displayed on the media device satisfies the threshold criterion:
      identifying an overlay content segment to be displayed on the electronic device in lieu of the media segment; and
      instructing the media device to display the overlay content segment in lieu of the media segment.

17. The overlay content server device of claim 16, wherein the operations further comprise, when instructing the media device to display the overlay content segment in lieu of the media segment, incrementing a display count tracking the number of times the media segment has been displayed on the media device.

18. The overlay content server device of claim 16, wherein the operations further comprise:
  receiving, at the data processing device, a notification from the media device indicating that the media device displayed the overlay content segment; and
  in response to receiving the notification, incrementing, by the data processing device, a display count tracking the number of times the media segment has been displayed on the media device.

19. The overlay content server device of claim 16, wherein the threshold criterion is satisfied when the number of times the media segment has been displayed on the media device is greater than a first count.

20. The overlay content server device of claim 19, wherein the threshold criterion is satisfied when the number of times the media segment has been displayed on the media device is less than a second count, the second count being greater than the first count.

21. The overlay content server device of claim 16, wherein the media segment is at least a portion of media content comprising a television show or a movie broadcast, and the media segment comprises a commercial.

22. The overlay content server device of claim 16, wherein sending the trigger comprises sending an invisible overlay to the media device for the media device to display.

23. The overlay content server device of claim 16, wherein sending the trigger comprises sending a web request to the media device, wherein the web request points to the data processing device.

* * * * *